US011436811B2

(12) United States Patent
Martinez Molina et al.

(10) Patent No.: US 11,436,811 B2
(45) Date of Patent: Sep. 6, 2022

(54) CONTAINER-BASED VIRTUAL CAMERA ROTATION

(71) Applicant: Microsoft Technology Licensing, LLC, Redmond, WA (US)

(72) Inventors: Harold Anthony Martinez Molina, Redmond, WA (US); Vidya Srinivasan, Issaquah, WA (US); Carlos G. Perez, Seattle, WA (US); Aniket Handa, Seattle, WA (US); Colton Brett Marshall, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 74 days.

(21) Appl. No.: 15/636,359

(22) Filed: Jun. 28, 2017

(65) Prior Publication Data

US 2018/0308274 A1 Oct. 25, 2018

Related U.S. Application Data

(60) Provisional application No. 62/489,904, filed on Apr. 25, 2017.

(51) Int. Cl.
*G06T 19/20* (2011.01)
*G06T 15/20* (2011.01)
(Continued)

(52) U.S. Cl.
CPC .............. *G06T 19/20* (2013.01); *A63F 13/63* (2014.09); *G06F 3/011* (2013.01); *G06F 3/012* (2013.01);
(Continued)

(58) Field of Classification Search
CPC ....... G06T 19/20; G06T 15/20; G06T 15/205; G06T 19/006; G06T 2200/24;
(Continued)

(56) References Cited

U.S. PATENT DOCUMENTS 5,511,157 A 4/1996 Wang
6,005,548 A 12/1999 Latypov et al.
(Continued)

FOREIGN PATENT DOCUMENTS

CA 2347290 A1 11/2002
CN 100421119 C 9/2008
(Continued)

OTHER PUBLICATIONS

Jonathan Antoine, "Calculate the real difference between two angles, keeping the correct sign," published on Apr. 1, 2009, retrieved from http://blog.lexique-du-net.com/index.php?post/Calculate-the-real-difference-between-two-angles-keeping-the-sign on Sep. 30, 2018.*
(Continued)

*Primary Examiner* — Xin Sheng
(74) *Attorney, Agent, or Firm* — Newport IP, LLC; Han K. Gim

(57) ABSTRACT

Methods and systems for controlling a view of a virtual camera in a virtual world. A view of user viewing a virtual world may be controlled or changed while accounting for a user's head position. For example, a virtual camera may be wrapped in a container such that rotation of the container causes rotation of the virtual camera relative to a global coordinate system. Based on a position of a head-mounted display, an initial virtual camera rotation angle relative to a global coordinate system of the virtual world may be identified. An indication to change to view to particular direction may be received. A desired rotation angle relative to the global coordinate system for a view to correspond to the
(Continued)

particular direction is then determined. The container is then rotated by a rotation value based at least on both the desired rotation angle and the initial virtual camera rotation angle.

20 Claims, 11 Drawing Sheets

(51) Int. Cl.
| | |
|---|---|
| G06F 16/11 | (2019.01) |
| A63F 13/63 | (2014.01) |
| G06F 3/01 | (2006.01) |
| G06F 3/04815 | (2022.01) |
| G06T 19/00 | (2011.01) |
| G06F 3/04842 | (2022.01) |

(52) U.S. Cl.
CPC ........ *G06F 3/04815* (2013.01); *G06F 16/122* (2019.01); *G06T 15/20* (2013.01); *G06T 15/205* (2013.01); *G06T 19/006* (2013.01); *G06F 3/04842* (2013.01); *G06T 2200/24* (2013.01); *G06T 2215/16* (2013.01); *G06T 2219/2016* (2013.01)

(58) Field of Classification Search
CPC ......... G06T 2215/16; G06T 2219/2016; A63F 13/63; G06F 16/122; G06F 3/011; G06F 3/012; G06F 3/04815; G06F 3/04842
See application file for complete search history.

(56) References Cited

U.S. PATENT DOCUMENTS

| | | | |
|---|---|---|---|
| 6,050,822 A | 4/2000 | Faughn | |
| 7,043,695 B2 | 5/2006 | Elber et al. | |
| 7,117,450 B1 | 10/2006 | Chaudhri | |
| 7,269,632 B2 | 9/2007 | Edeker et al. | |
| 7,657,406 B2 | 2/2010 | Tolone et al. | |
| 7,747,105 B2 | 6/2010 | Koch | |
| 8,224,024 B2 | 7/2012 | Foxlin et al. | |
| 8,473,263 B2 | 6/2013 | Tolone et al. | |
| 8,584,025 B2 | 11/2013 | Dawson et al. | |
| 8,585,476 B2 | 11/2013 | Mullen | |
| 8,601,386 B2 | 12/2013 | Altberg et al. | |
| 8,681,179 B2 | 3/2014 | Rolleston et al. | |
| 9,092,853 B2 | 7/2015 | Sachs et al. | |
| 9,111,347 B2 | 8/2015 | Ben Himane | |
| 9,210,413 B2 | 12/2015 | Grinberg et al. | |
| 9,251,590 B2 | 2/2016 | Sharp et al. | |
| 9,311,744 B2 | 4/2016 | Wu et al. | |
| 9,392,212 B1 | 7/2016 | Ross | |
| 9,401,050 B2 | 7/2016 | Cajigas et al. | |
| 9,405,359 B2 | 8/2016 | Rhee et al. | |
| 9,520,002 B1 | 12/2016 | Gavriliuc et al. | |
| 9,817,375 B2 | 11/2017 | Li et al. | |
| 10,388,077 B2 | 8/2019 | Srinivasan et al. | |
| 10,453,273 B2 | 10/2019 | Perez et al. | |
| 11,087,560 B2 | 8/2021 | Srinivasan et al. | |
| 2002/0089506 A1 | 7/2002 | Templeman | |
| 2002/0158873 A1 | 10/2002 | Williamson | |
| 2003/0146973 A1 | 8/2003 | Swift et al. | |
| 2004/0135820 A1 | 7/2004 | Deaton et al. | |
| 2004/0233222 A1 | 11/2004 | Lee et al. | |
| 2010/0045701 A1 | 2/2010 | Scott et al. | |
| 2010/0123737 A1 | 5/2010 | Williamson et al. | |
| 2011/0009241 A1 | 1/2011 | Lane et al. | |
| 2011/0270135 A1 | 11/2011 | Dooley et al. | |
| 2012/0233555 A1 | 9/2012 | Psistakis et al. | |
| 2013/0024764 A1 | 1/2013 | Lou et al. | |
| 2013/0044128 A1 | 2/2013 | Liu et al. | |
| 2013/0144566 A1 | 6/2013 | De Biswas | |
| 2014/0049559 A1 | 2/2014 | Fleck et al. | |
| 2014/0114845 A1 | 4/2014 | Rogers et al. | |
| 2014/0245160 A1 | 8/2014 | Bauer et al. | |
| 2014/0254921 A1 | 9/2014 | Areas et al. | |
| 2015/0015458 A1 | 1/2015 | Cho et al. | |
| 2015/0182855 A1 | 7/2015 | Tolk et al. | |
| 2015/0249815 A1 | 9/2015 | Sandrew et al. | |
| 2016/0026253 A1 | 1/2016 | Bradski et al. | |
| 2016/0027213 A1 | 1/2016 | Burns et al. | |
| 2016/0035139 A1 | 2/2016 | Fuchs et al. | |
| 2016/0078683 A1 | 3/2016 | Sudol et al. | |
| 2016/0125655 A1 | 5/2016 | Tian et al. | |
| 2016/0140763 A1 | 5/2016 | Seichter et al. | |
| 2016/0180595 A1 | 6/2016 | Grossinger et al. | |
| 2016/0217623 A1 | 7/2016 | Singh | |
| 2016/0246384 A1 | 8/2016 | Mullins et al. | |
| 2017/0038837 A1 | 2/2017 | Faaborg et al. | |
| 2017/0108922 A1 | 4/2017 | Terahata | |
| 2017/0123215 A1* | 5/2017 | Li | B64D 43/00 |
| 2017/0169616 A1 | 6/2017 | Wiley et al. | |
| 2017/0180721 A1* | 6/2017 | Parker | H04N 13/383 |
| 2017/0372499 A1 | 12/2017 | Lalonde | |
| 2018/0308289 A1 | 10/2018 | Srinivasan et al. | |
| 2018/0308290 A1 | 10/2018 | Perez et al. | |
| 2020/0013236 A1 | 1/2020 | Perez et al. | |

FOREIGN PATENT DOCUMENTS

| | | |
|---|---|---|
| CN | 103761996 A | 4/2014 |
| CN | 105453011 A | 3/2016 |
| CN | 105912310 A | 8/2016 |
| CN | 106457569 A | 2/2017 |
| CN | 106462324 A | 2/2017 |
| JP | H09282483 A | 10/1997 |
| JP | H11265462 A | 9/1999 |
| JP | 2000090285 A | 3/2000 |
| JP | 2002092653 A | 3/2002 |
| JP | 2002334349 A | 11/2002 |
| JP | 2003236178 A | 8/2003 |
| JP | 2017004356 A | 1/2017 |
| JP | 2017055173 A | 3/2017 |
| JP | 2017058493 A | 3/2017 |
| JP | 2017068851 A | 4/2017 |
| KR | 20170099755 A | 9/2017 |
| RU | 2014125226 A | 12/2015 |
| RU | 168332 U1 | 1/2017 |
| WO | 2005045756 A2 | 5/2005 |
| WO | 2015027105 A1 | 2/2015 |
| WO | 2015127534 A1 | 9/2015 |
| WO | 2015185579 A1 | 12/2015 |
| WO | 2016014878 A1 | 1/2016 |
| WO | 2018200200 A1 | 11/2018 |

OTHER PUBLICATIONS

Author Unknown, "Camera rotation around a central pivot point", retrieved on Apr. 1, 2019 from http://www.java-gaming.org/topics/camera-rotation-around-a-central-pivot-point/30112/view.html, posted before Jul. 10, 2013.*

"International Search Report and Written Opinion Issued in PCT Application No. PCT/US2018/026995", dated Jul. 3, 2018, 14 Pages.

Andy, Borell, "Introducing the Oculus Sample Framework for Unity 5", In Journal of Oculus Developers Blog, Mar. 8, 2016, 6 Pages.

Bozgeyikli, et al., "Point & Teleport Locomotion Technique for Virtual Reality", In Proceedings of the ACM 2016 Annual Symposium on Computer-Human Interaction in Play., Sep. 16, 2016, 12 Pages.

Knodel, et al., "Navidget for immersive virtual environments", In Proceedings of the 2008 ACM Symposium on Virtual Reality Software and Technology, Oct. 27, 2008, 4 Pages.

Teper, Jeff, "The Future of SharePoint", https://blogs.office.com/2016/05/04/the-future-of-sharepoint/, Published on: May 4, 2016, 18 pages.

"The virtual and augmented reality market will reach $162 billion by 2020", http://www.businessinsider.com/virtual-and-augmented-reality-markets-will-reach-162-billion-by-2020-2016-8?IR=T, Published on: Aug. 22, 2016, 5 pages.

(56) References Cited

OTHER PUBLICATIONS

"Microsoft HoloLens", https://www.microsoft.com/microsoft-hololens/en-US, Retrieved on: Apr. 10, 2017, 8 pages.
"Oculus Connect 3—2016—Developer Sessions", https://www.youtube.com/playlist?list=PLL2xVXGs1SP7RjXUBwur43flR7tRcbYLD, Retrieved on: Apr. 10, 2017, 4 pages.
"How to Make Your Own Virtual Reality", https://cospaces.io/create.html, Retrieved on: Apr. 7, 2017, 11 pages.
Cho, et al., "3D Panorama Generation Using Depth-MapStitching", In Journal of information and communication convergence engineering, vol. 9, Issue 6, Dec. 2011, pp. 780-784.
Teitelbaum, Ron, "Are there any good Virtual Reality authoring tools out there for Subject Matter Experts (not coders) to create educational or training content?", Published on: Jun. 16, 2016, 3 pages.
Anchors, "https://docs.unity3d.com/Manual/windowsholographic-anchors.html", Published on: Mar. 29, 2017, 1 page.
"World anchor in Unity", https://developer.microsoft.com/en-us/windows/mixed-reality/world_anchor_in_unity, Retrieved on: Apr. 10, 2017, 3 pages.
Interrante, et al., "Seven League Boots: A New Metaphor for Augmented Locomotion through Moderately Large Scale Immersive Virtual Environments", In Proceedings of IEEE Symposium on 3D User Interfaces, Mar. 2007, 4 pages.
Reitmayr, et al., "Going out: Robust Model-based Tracking for Outdoor Augmented Reality", In Proceedings of 5th IEEE/ACM International Symposium on Mixed and Augmented Reality, Oct. 22, 2006, 10 pages.
"Camera Rotation newbie question", http://answers.unity3d.com/questions/1329035/camera-rotation-newbie-question.html, Retrieved on: Apr. 10, 2017, 2 pages.
"Best practices for mixed reality AR/VR experiences", https://library.vuforia.com/articles/Best_Practices/Best-practices-for-hybrid-VRAR-experiences, Published on: 2011, 4 pages.
Ismail, Nick, "Digital transformation in the workplace: VR and AR will revolutionise the office", http://www.information-age.com/digital-transformation-vr-ar-will-revolutionise-office-123465183/, Published on: Mar. 22, 2017, 7 pages.
Kasriel, Stephane, "This Is What Your Future Virtual-Reality Office Will Be Like", https://www.fastcompany.com/3061923/this-is-what-your-future-virtual-reality-office-will-be-like, Published on: Jul. 19, 2016, 34 pages.
"Space and Perspective in VR", http://blog.leapmotion.com/space-and-perspective/, Published on: Mar. 14, 2017, 8 pages.
Nafarrete, Jonathan, "Tilt Brush Adds Rotate, Resize, Import of 3D Models and Pictionary", http://vrscout.com/news/tilt-brush-adds-rotate-resize-import-3d-models-pictionary/, Sep. 8, 2016, 17 pages.
Keith Hammond, "MakeVR Lets You Create 3D Models in Virtual Reality with Real CAD", "http://makezine.com/2017/03/27/makevr-lets-create-3d-models-virtual-reality-real-cad/", Mar. 27, 2017, 19 pages.
"About Pre-scaling 3D Objects", https://docs.toonboom.com/help/storyboard-pro-5/storyboard/3d/about-pre-scale-3d-object.html, May 5, 2016, 3 pages.
Speagle, Ashley, "3D, Mixed Reality and the MicrosoftWindows 10 Event", http://blogs.air-watch.com/2016/10/3d-mixed-reality-microsoft-windows-10-event/, Oct. 26, 2016, 9 pages.
Conner, et al., "Three-Dimensional Widgets", In Proceedings of the symposium on Interactive 3D graphics, Jun. 1, 1992, pp. 183-231.
Greenhalgh, Christopher., "Large Scale Collaborative Virtual Environments", In Publication of Springer Science & Business Media, Dec. 6, 2012, 1 page.
"Drone Designer", http://web.archive.org/web/20150610033757/http:/www.wasp3d.com/drone_designer.html, Jun. 10, 2015, 6 pages.
"Chilipeppr/widget-3dviewer", https://github.com/chilipeppr/widget-3dviewer, Retrieved on: Apr. 7, 2017, 8 pages.
Mehta, Siddhant., "Volumetric Framework for Third-Party Content Placement in Virtual 3D Environments", In Technical Disclosure Commons, Mar. 9, 2017, 11 pages.

"The Entire Internet is now 3D—ExitReality Launches Public Beta", http://www.exitreality.com/?page_id=156, Jul. 26, 2013, 2 pages.
Lau, Vivian, "Edan Kwan's CSS Program Can Transform Websites into 3-D", http://www.trendhunter.com/trends/transform-websites-into-3-d, May 11, 2012, 12 pages.
Elfarargy, et al., "VEGI: Virtual Environment GUI Immersion System", http://vista.bibalex.org/Attachment/Publication/2013040911061923113_VEGIVirtualEnvironmentGUIImmersionsystem.pdf, Mar. 19, 2011, pp. 205-206.
Unity Documentation Webpage, "Game Object", located online on Jun. 28, 2017 at: https://docs.unity3d.com/Manual/class-GameObject.html, 2 pages.
Unity Documentation Webpage, "Transform", located online on Jun. 28, 2017 at: https://docs.unity3d.com/Manual/class-Transform.html, 2 pages.
Unity Documentation Webpage, "Transform", located online on Jun. 28, 2017 at: https://docs.unity3d.com/ScriptReference/Transform-rotation.html, 2 pages.
"Level of detail", Retrieved From: https://en.wikipedia.org/w/index.php?title=Level_of_detail&oldid=753162783, Dec. 5, 2016, 4 Pages.
"Non Final Office Action issued in U.S. Appl. No. 15/636,125", dated Sep. 21, 2018, 14 Pages. (MS#402540-US-NP).
"Final Office Action Issued in U.S. Appl. No. 15/636,321", dated Feb. 14, 2019, 30 Pages. (MS# 402542-US-NP).
"Non-Final Office Action Issued in U.S. Appl. No. 15/636,321", dated Aug. 10, 2018, 27 Pages. (MS# 402542-US-NP).
Akella, et al., "The Basics of Dynamic Simulation", AutoDesk University, Jan. 2006, pp. 1-24.
Autodesk, "6: Joints and Motion, Autodesk Fusion 360", Retrieve from: https://www.youtube.com/watch?v=nngmNos6VI4, Jun. 2015, 3 Pages.
Luebke, et al., Level of Detail for 3D Graphics, Morgan Kaufmann Publishers, Jan. 2003, 31 Pages.
Donzellini, et al., "A Simulation Environment fore-learning in Digital Design", In IEEE Transactions on Industrial Electronics, 8 Pages.
Luchetta, et al., "SAPWIN—A Symbolic Simulator as a Support in Electrical Engineering Education," In IEEE Transactions on Education, vol. 44, Issue 2, May 2001, pp. 1-11.
Luebke, et al., "8 Perceptual Issues", In Book—Level of Detail for 3D Graphics, Morgan Kaufmann Publishers, Jan. 2003, pp. 231-239.
"International Search Report and Written Opinion Issued in PCT Application No. PCT/US18/026994", dated Jul. 3, 2018, 13 Pages. (MS# 402540-WO-PCT).
"International Search Report and Written Opinion Issued in PCT Application No. PCT/US18/026996", dated Jul. 3, 2018, 12 Pages. (MS# 402542-WO-PCT).
"Advisory Action Issued in U.S. Appl. No. 16/571,646", dated Jul. 1, 2020, 6 Pages.
"Final Office Action Issued in U.S. Appl. No. 16/571,646", dated Apr. 22, 2020, 29 Pages.
"Final Office Action Issued in U.S. Appl. No. 16/571,646", dated Jan. 7, 2021, 30 Pages.
"Non Final Office Action Issued in U.S. Appl. No. 16/571,646", dated Oct. 30, 2019, 25 Pages.
"Non Final Office Action Issued in U.S. Appl. No. 16/571,646", dated Aug. 4, 2020, 29 Pages.
"Office Action Issued in European Patent Application No. 18722795.4", dated Oct. 30, 2020, 7 Pages.
"Summons to Attend Oral Proceedings Issued in European Patent Application No. 18722795.4", dated Mar. 12, 2021, 11 Pages.
"Office Action Issued in European Patent Application No. 18723617.9", dated Nov. 2, 2020, 9 Pages.
"Summons to Attend Oral Proceedings Issued in European Patent Application No. 18723617.9", dated May 14, 2021, 13 Pages.
"Office Action Issued in European Patent Application No. 18724378.7", dated Dec. 10, 2020, 6 Pages.
"Notice of Allowance and Search Report Issued in Chinese Patent Application No. 201880027519.5", dated Sep. 15, 2021, 9 Pages.
"Office Action and Search Report Issued in Chile Patent Application No. 201902950", dated Apr. 15, 2021, 14 Pages.

(56) References Cited

OTHER PUBLICATIONS

"Office Action and Search Report Issued in Chile Patent Application No. 201902950", dated Jul. 15, 2021, 12 Pages.
"Office Action and Search Report Issued in Chile Patent Application No. 201902951", dated Apr. 15, 2021, 12 Pages.
"Office Action Issued in Chile Patent Application No. 201902951", dated Jan. 14, 2021, 12 Pages.
"Office Action Issued in Russian Patent Application No. 2019137605", dated Sep. 1, 2021, 16 Pages.
"Office Action Issued in Russian Patent Application No. 2019137607", dated Jul. 12, 2021, 18 Pages.
"Office Action Issued in Israel Patent Application No. 270112", dated Nov. 11, 2021, 6 Pages.
Diverdi, et al., "Level of Detail Interfaces", In Proceedings of the Third IEEE and ACM International Symposium on Mixed and Augmented Reality, Nov. 5, 2004, 2 Pages.
Michel, Thibaud, "AmiAr—Smart Home Augmented Reality on a Smartphone", Retrieved from: https://www.youtube.com/watch?v=_un8dfGPpNA, Apr. 24, 2017, 14 Pages.
"Office Action and Search Report Issued in Colombian Patent Application No. NC2019/0011870", dated Nov. 29, 2021, 21 Pages.
Alger, Mike, "Visual Design Methods for Virtual Reality", Retrieved From: http://aperturesciencellc.com/vr/VisualDesignMethodsforVR_MikeAlger.pdf, Sep. 2015, 98 Pages.
"Office Action Issued in Australian Patent Application No. 2018260575", dated Jan. 15, 2022, 4 Pages.
"Office Action Issued in Israel Patent Application No. 270118", dated Dec. 29, 2021, 6 Pages.
"Office Action Issued in Indian Patent Application No. 201947042246", dated Jan. 26, 2022, 6 Pages.
"Office Action Issued in Colombian Patent Application No. NC2019/0011966", dated Dec. 20, 2021, 31 Pages.
"Office Action Issued in Indian Patent Application No. 201947041821", dated Feb. 7, 2022, 5 Pages.
"Office Action Issued in Indian Patent Application No. 201947041977", dated Feb. 4, 2022, 6 Pages.
"Summons to attend oral proceedings Issued in European Patent Application No. 18724378.7", dated Mar. 23, 2022, 12 Pages.
"Notice of Allowance Issued in Austrailian Patent Application No. 2018260575", dated Apr. 12, 2022, 3 Pages.
"Office Action Issued in Chile Patent Application No. 201902950", dated Apr. 28, 2022, 5 Pages.
"Office Action Issued in Russian Patent Application No. 2019137605", dated Apr. 12, 2022, 14 Pages.
"Notice of Allowance Issued in Japnese Patent Application No. 2019-558550", dated Apr. 26, 2022, 5 Pages.
Bowman, et al., "Travel in Immersive Virtual Environments: An Evaluation of Viewpoint Motion Control Techniques", In Proceedings of IEEE Annual International Symposium on Virtual Reality, Mar. 1, 1997, pp. 45-52.
"Office Action Issued in Colombian Patent Application No. 2019/0011870", dated Mar. 31, 2022, 32 Pages.
"Office Action Issued in Indonesia Patent Application No. P00201909534", dated May 13, 2022, 4 Pages.
"Office Action Issued in Japanese Patent Application No. 2019-558437", dated Apr. 6, 2022, 7 Pages.

\* cited by examiner

CONTAINER-BASED VIRTUAL CAMERA ROTATION

CROSS-REFERENCE TO RELATED APPLICATIONS

This application claims the benefit of U.S. Provisional Application No. 62/489,904, filed Apr. 25, 2017, the entirety of which is incorporated by reference herein.

BACKGROUND

Publishing sites have been a key way to share and consume information on the web. A handful of services exist that democratize web site creation. However, services do not exist to solve the problem of creating sites that realize the full potential of 3D content. With an increasing push to create easy 3D content, there is a need for tools and/or services to facilitate the consumption of the 3D content. For instance, moving within a virtual world through the use a virtual reality device is often challenging. In some cases, users may not understand how to utilize or interact with the virtual world. Further, automatically moving the user through the virtual world can be difficult to accomplish and may cause discomfort or motion sickness of the user.

It is with respect to these and other general considerations that embodiments have been described. Also, although relatively specific problems have been discussed, it should be understood that the embodiments should not be limited to solving the specific problems identified in the background.

SUMMARY

The present technology relates to controlling a user's view in a virtual world, such as a virtual 3D space. For example, a user may be wearing a head-mounted display (HMD) that provides a virtual reality view of the virtual world. While the user is viewing the virtual world through the HMD, the user may wish to interact with objects in the virtual world. To facilitate interactions with the virtual world, the present technology alters the user's view by associating, or wrapping, the virtual camera in a container. The virtual camera and the container are associated in such a manner that changes to the orientation of the container cause a change in orientation of the virtual camera. As such, by controlling the orientation of the container, a program can control the view experienced by the user. The present technology also accounts for the rotation of a user's head while wearing the device, such that a final view is the view desired by a program presenting the virtual world. For instance, the technology may determine a rotation angle of the virtual camera prior to rotating the container to a new desired view. The technology then adjusts the amount of rotation for the container based on the determined rotation angle of the virtual camera. By compensating for the virtual camera rotation angle, which is controlled by the orientation of the user's head, the final view of the user is in the direction originally desired by the program.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
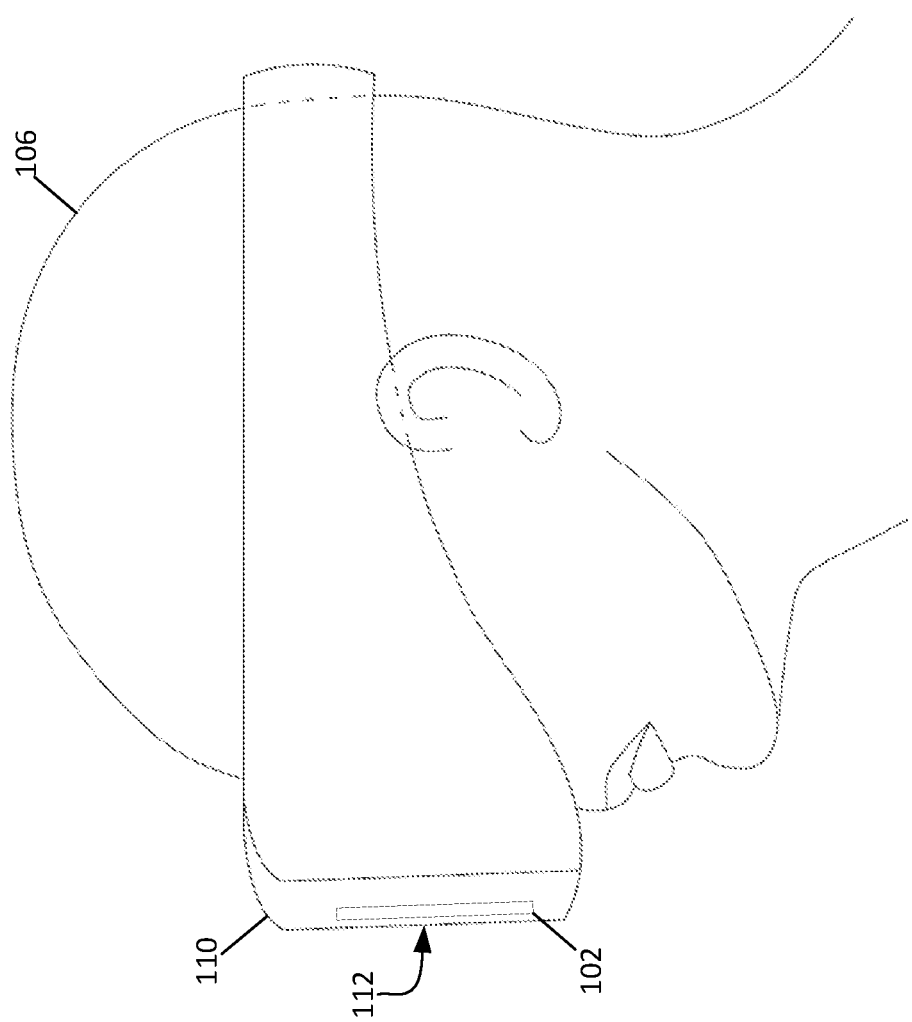
FIG. 1 illustrates an example of a head-mounted display.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present technology relates to controlling a user's view in a virtual world, such as a virtual 3D space. For example, a user may be wearing a head-mounted display (HMD) that provides a virtual reality view of the virtual world. While the user is viewing the virtual world through the HMD, the user may wish to interact with objects in the virtual world. To facilitate such interaction, the present technology provides for displaying locomotion markers in the virtual world that may be selected by the user. Once the user selects the locomotion marker, the user's view is transported to a view associated with the locomotion maker. As an example, a particular locomotion marker may be selected to view a particular object in the virtual world from a particular position and a particular orientation. Rotation of the user's view upon selection of the locomotion marker, however, poses multiple challenges that the present technology overcomes, as discussed further below.

As will be appreciated by those having skill in the art, in a virtual world, the user's view corresponds to the positioning and orientation of a virtual camera in the virtual world. Changes to the positioning and orientation of the virtual camera in the virtual world cause the view of the virtual world experienced by the user changes. When an HMD is utilized as the viewing device for the user to see the virtual world, the orientation of the virtual camera is generally tied to the orientation of the head of the user wearing the HMD. Accordingly, with an HMD, the orientation of the virtual camera cannot generally be overridden by a computer program. Thus, when a program needs to alter a user's view in the virtual world, such an action is challenging to accomplish.

The present technology alters the user's view by associating, or wrapping, the virtual camera in a container. The virtual camera and the container are associated in such a manner that changes to the orientation of the container cause a change in orientation of the virtual camera. As such, by controlling the orientation of the container, a program can control the view experienced by the user. Even with this implementation, further challenges still exist because the user is still free to move the virtual camera with respect the container. As an example, a program may need to direct a user's view to a direction that is 60 degrees to the left of a global coordinate system for the virtual world. This action may need to be performed to cause the user's view to be looking at a particular object within the virtual world. Rotation of the container by 60 degrees with respect to the global coordinate system, however, may not result in the user's view being at 60 degrees to the left because the user may have already been looking to the left (or any other direction other than 0 degrees with respect to the global coordinate system). Thus, rotation of the container by 60 degrees would result in the user having a view in an undesired direction. The present technology overcomes this limitation by determining a rotation angle of the virtual camera prior to rotating the container to the new view, and adjusts the amount of rotation for the container based on the determined rotation angle of the virtual camera. By compensating for the virtual camera rotation angle, which is controlled by the orientation of the user's head, the final view of the user is in the direction originally desired by the program.

FIG. 1 depicts an example of a head-mounted display system ("HMD") 110 having a display source 102 according to an example of the present technology. The HMD 110 may be worn by a user 106 to provide content to the user 106 through the display source 102, such as virtual reality content or augmented reality content. In the example of providing augmented reality content, the front surface of HMD 110 may incorporate one or more cameras to allow an augmented video stream to be presented to the user 106 through the display source 102, which may be referred to as video augmented reality. The HMD 110 may also include integrated computing components to provide content as a stand-alone system. The HMD 110 may also include wireless or wired connectivity features to receive content from other computing devices, such as mobile phones, tablets, laptops, desktops, and the like. The display source 102 may be affixed towards the front of the HMD 110 using any means known to those having skill in the art. In some examples, the HMD 110 includes multiple display sources 102. For instance, the HMD 110 may include a display source 102 for each eye. In other examples, the display source 102 may be a smartphone or other similar device. The display source 102 may also include, or be displaced proximate to, lenses that allow for the user to more clearly see the images displayed on the display source. Other example HMD's that may be suitable for use with the present technology are described in U.S. Patent Publication No. 2016/0027213, which is incorporated herein by reference in its entirety.

Figure 2A:
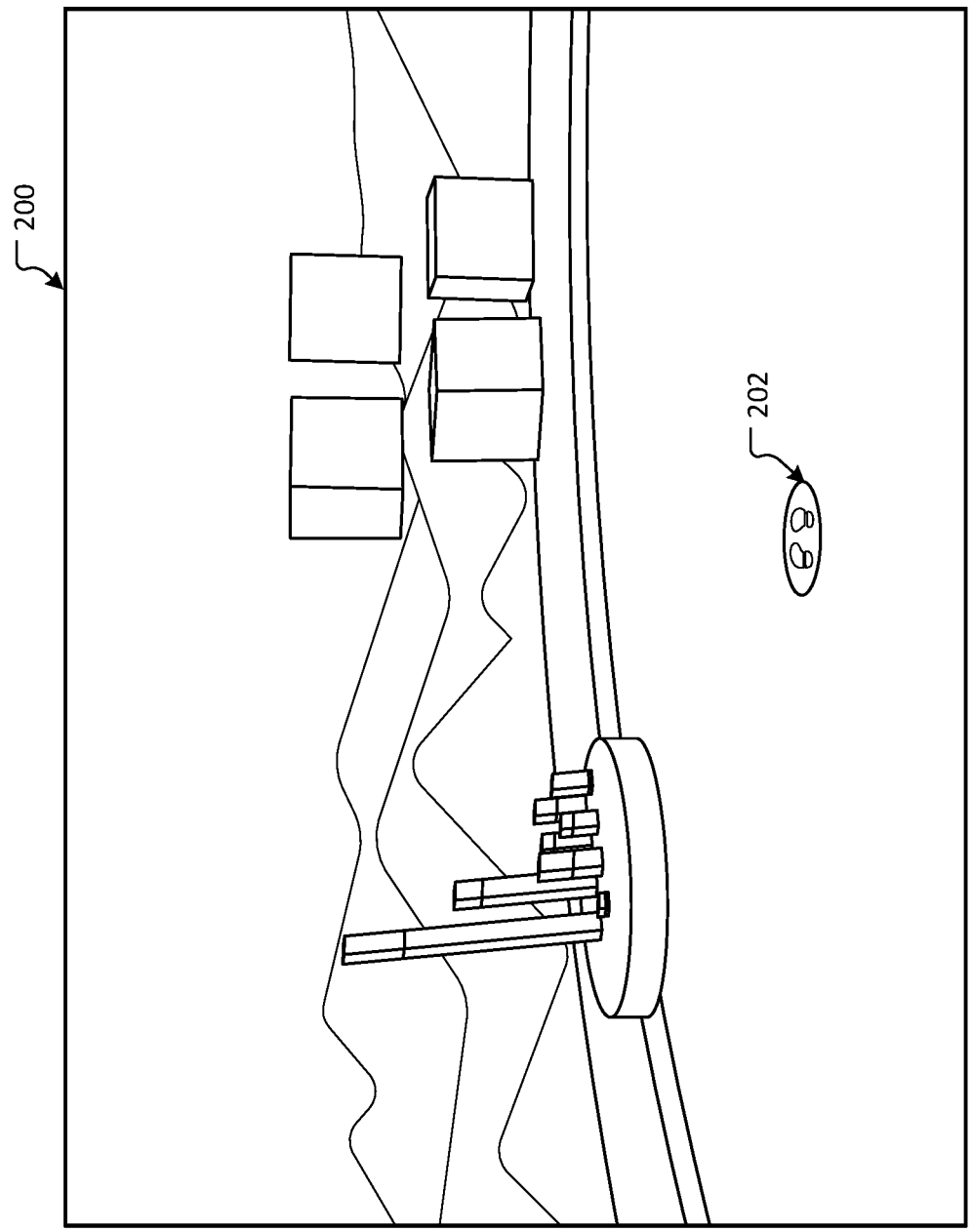
FIG. 2A illustrates an example view within a 3D space illustrating a locomotion marker.

FIG. 2A depicts an example view within a virtual world illustrating a locomotion marker. To help a user navigate a virtual world, one or more selectable locomotion markers may be placed within the virtual world that identify placement locations for a user within the virtual world. In some examples, the locomotion markers may be displayed within the virtual world when a user's view, or gaze, is positioned within or directed to a predetermined area around the locomotion marker. In further examples, in addition to identifying locations that the user can move through the 3D space, the locomotion marker may provide an indication of a default direction of the user's view upon moving to the 3D space. For example, users may traverse a virtual world by teleporting from one location to another. Upon teleporting to a new space, a user may become disoriented. The indication of the user's view may provide context to the user that allows the user to better understand the user's orientation within the virtual world after teleportation. As an example, a user may select the locomotion marker 202 to transport to the location of the locomotion marker 202. In the example view 200 depicted, the direction of the shoes provide the user an indication what the user's view orientation will be upon being teleported to the location of the locomotion marker, thereby giving the user context to better understand the user's orientation upon teleportation. Other visual or graphical information, besides shoes, may also be utilized to provide an indication of a user's final orientation upon being teleported to the location of the locomotion marker 202.

Figure 2B:
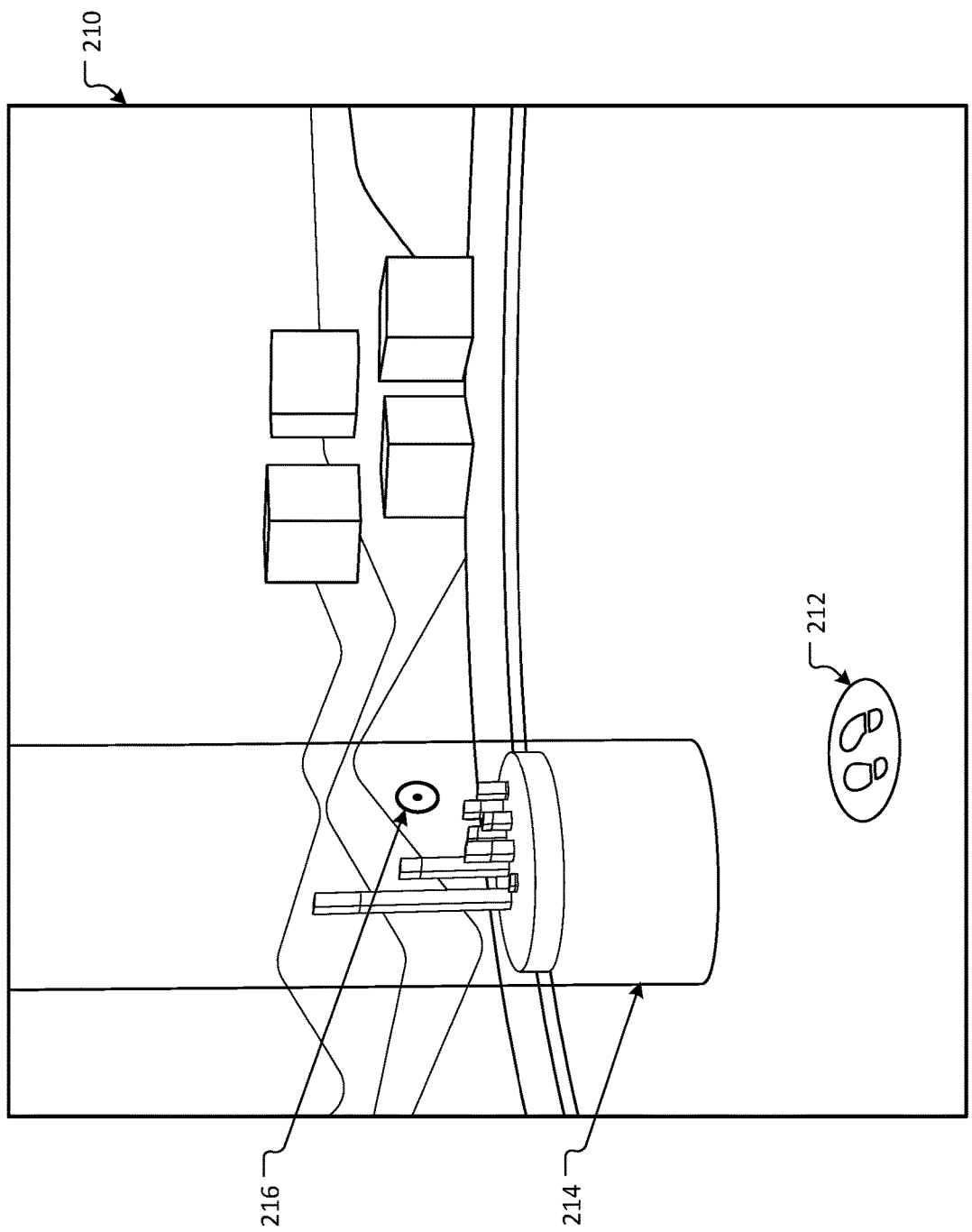
FIG. 2B illustrates an example in which a locomotion marker is displayed at a position around a 3D object in the virtual world.

One or more locomotion markers may also be associated with content. In some examples, when 3D content within the virtual world is created or modified, a locomotion marker may be associated with the 3D content that places a user in an optimal or preferred position and orientation to view the 3D object. In such examples, when the user's gaze focuses on or near the 3D object, a locomotion marker may be displayed that is properly oriented to view the object. The displayed locomotion marker may be selected to teleport the user to the optimal position and orientation in order to view the 3D object within the virtual world. FIG. 2B depicts an example view 210 in which a locomotion marker 212 is displayed at an optimal or preferred position around a 3D object in the virtual world. Upon selection of the locomotion marker 212, the user is teleported to the selected position and the user's view will be altered to the optimal or preferred direction for viewing the 3D object.

The virtual world in the example view 210 also includes a snap zone 214 and a view direction marker 216. The snap zone 214 highlights a particular 3D object in the virtual world when the user's gaze is directed to the 3D object. The snap zone 216 may be displayed as a semi-transparent 3D object that surrounds another 3D object. For instance, in the virtual world depicted in view 210, the snap zone is depicted as a cylinder around a 3D object in the virtual world. The size and shape of the snap zone 216 may be depending on the shape and size of the 3D object for which it surrounds. The snap zone 214 may be equivalent to the predetermined area discussed above. The snap zone 214 may also include a view direction marker 216. The view direction marker 216 indicates what the direction of the user's view will be upon selection of the locomotion marker 212. For example, if a user selects the depicted locomotion marker 212, the user will be transported to the position of the locomotion marker 212 and the user's view will be oriented towards the view direction marker 216. In some examples, the view direction marker 216 may be displayed directly on the underlying object, rather than on a snap zone 214.

Figure 3:
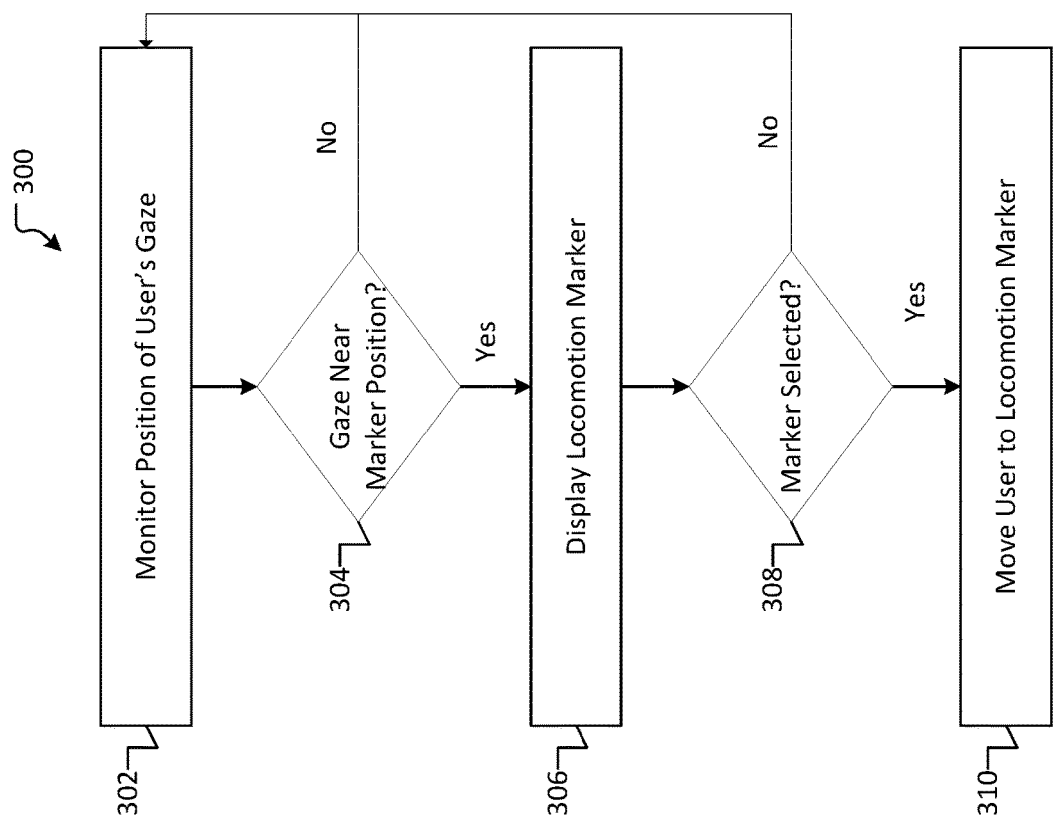
FIG. 3 depicts an example method for displaying a locomotion marker.

FIG. 3 depicts an example method 300 for displaying a locomotion marker. Flow begins at operation 302 where the position and orientation of a user's gaze, or view, is monitored. At operation 304, a determination is made as to whether a user's gaze is directed to a predetermined area around a 3D object associated with a locomotion marker. Determining whether the user's gaze is within the predetermined area may be based on identifying at least one of a pitch angle, yaw angle, or roll angle value for the virtual camera controlled by the position of the HMD. If the directional vector corresponding to the at least one the pitch, yaw, or roll value would pass through the predetermined area, the user's gaze may be determined to be directed to the predetermined area around the 3D object. One example of a predetermined area is the snap zone 214 discussed above with reference to FIG. 2B. In some examples, the size of the predetermined area may vary based upon the size of the virtual world, and/or the size or type of a 3D object associated with the locomotion marker, among other possible options. If the user's gaze is not within the predetermined area, flow branches No and returns to operation 302 and the position of the user's gaze is continually monitored.

If the users gaze is within a predetermined area around the 3D object associated with the locomotion marker, flow branches Yes to operation 302. At operation 302, the locomotion marker is displayed within the virtual world. As previously described, the locomotion marker may also provide an indication of the direction of that the user's gaze will change to upon moving or teleporting to the locomotion marker. In some examples, the locomotion marker may be displayed only when the user's gaze is within a predetermined area around the 3D object associated with the locomotion marker. In alternate aspects, one or more locomotion markers may be continuously displayed within the virtual world.

The process continues to decision operation 308 where a determination is made as to whether the displayed locomotion marker has been selected. The locomotion marker may be selected through a hand-held control unit, though a smart phone, through other controls operatively connected to the HMD, or based on a particular gaze or view of the user. The locomotion marker may also be selected by any means known to those having skill in the art. If the displayed locomotion marker is not selected, flow branches No and returns to operation 302 where the monitoring of the user's gaze continues. If the locomotion marker is selected, flow branches Yes to operation 310 and the user is automatically moved or teleported to the locomotion marker within the 3D space. In addition to moving the user to the selected location within the 3D space, the user's orientation may be altered to an orientation defined by the selected locomotion marker.

Figure 4:
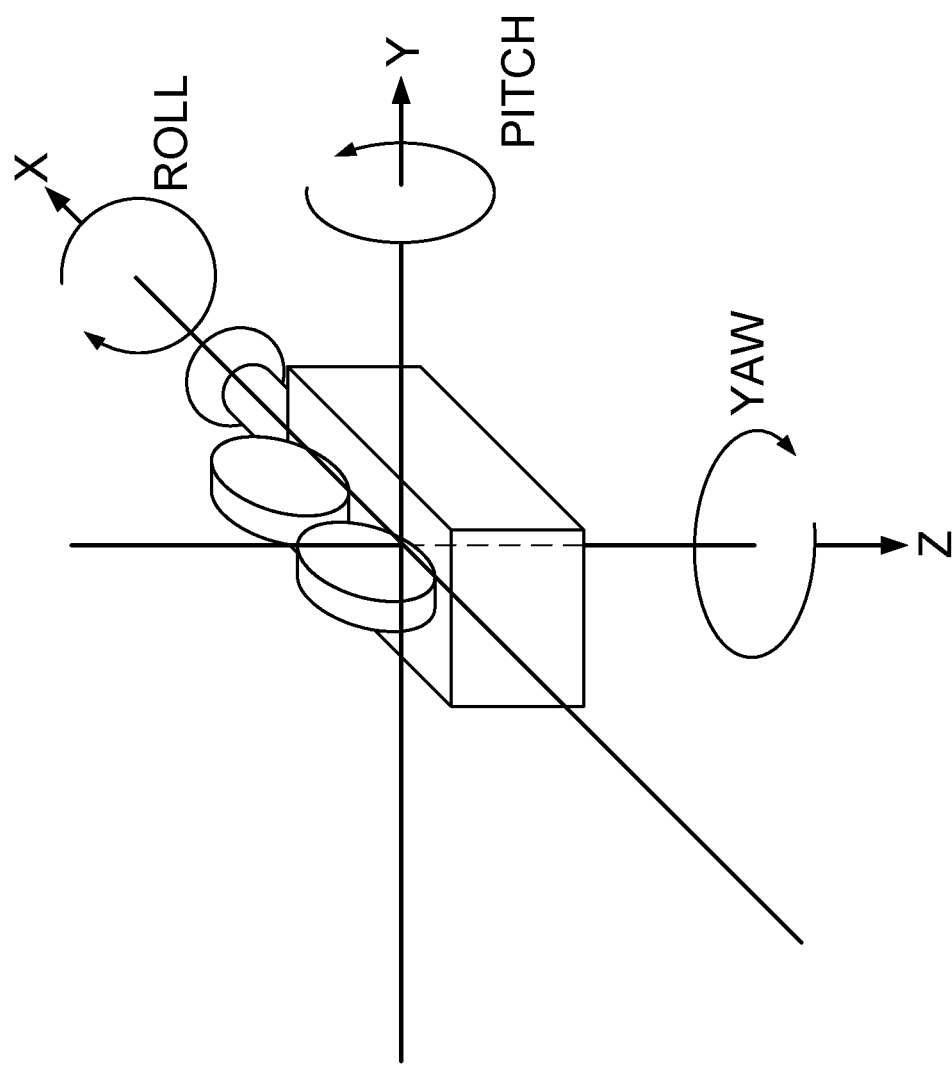
FIG. 4 depicts an example orientation reference system for a virtual camera.

As discussed above, the orientation of the user's view or gaze within the virtual world is based on the orientation virtual camera in the virtual world. The virtual camera is controlled by the positioning of the HMD in the real world. The orientation of the virtual camera may be made with reference to a global coordinate system of the virtual world. For example, the virtual world may utilize a 3D Cartesian coordinate system having a pre-defined origin. The virtual camera may be considered an object within the virtual world, and its orientation may be defined by its Euler angles with respect to the global coordinate system. For reference, FIG. 4 depicts a simplified image for discussion of different rotation types discussed herein. With respect to orientation, rotation around the depicted x-axis is referred to herein as roll (commonly represented by the symbol φ (phi)), rotation around the depicted y-axis is referred to herein as pitch (commonly represented by the symbol θ (theta)), and rotation around the depicted z-axis is referred to herein as yaw (commonly represented by the symbol ψ (psi)). As will be appreciated by those having skill in the art, different axis and rotation naming conventions may be utilized. Those having skill in the art will also appreciate that different techniques for controlling or representing rotation of a virtual object, such as the use of rotation matrices, quaternions, or other techniques, may be utilized with the technology utilized herein.

As also discussed above, with an HMD, the orientation of the virtual camera cannot generally be overridden by a computer program. Thus, when a program needs to alter a user's view in the virtual world, such an action is challenging to accomplish. The present technology alters the user's view by associating, or wrapping, the virtual camera in a container. In some examples, the container may be a software object, such as a null object or a GameObject as utilized in the Unity Technologies programming platform. In some cases, that object may be displayed in the virtual world, but in other examples the object is not displayed within the visual world. The virtual camera and the container are associated in such a manner that changes to the orientation of the container cause a change in orientation of the virtual camera. The present technology also compensates for the user's view orientation just before or during the transition to a final view, such as a view associated with a selected locomotion marker. By compensating for the virtual camera rotation angle, which is controlled by the orientation of the user's head, the final view of the user is in the direction initially desired by the program, such as the direction associated with the selected locomotion marker.

Figure 5:
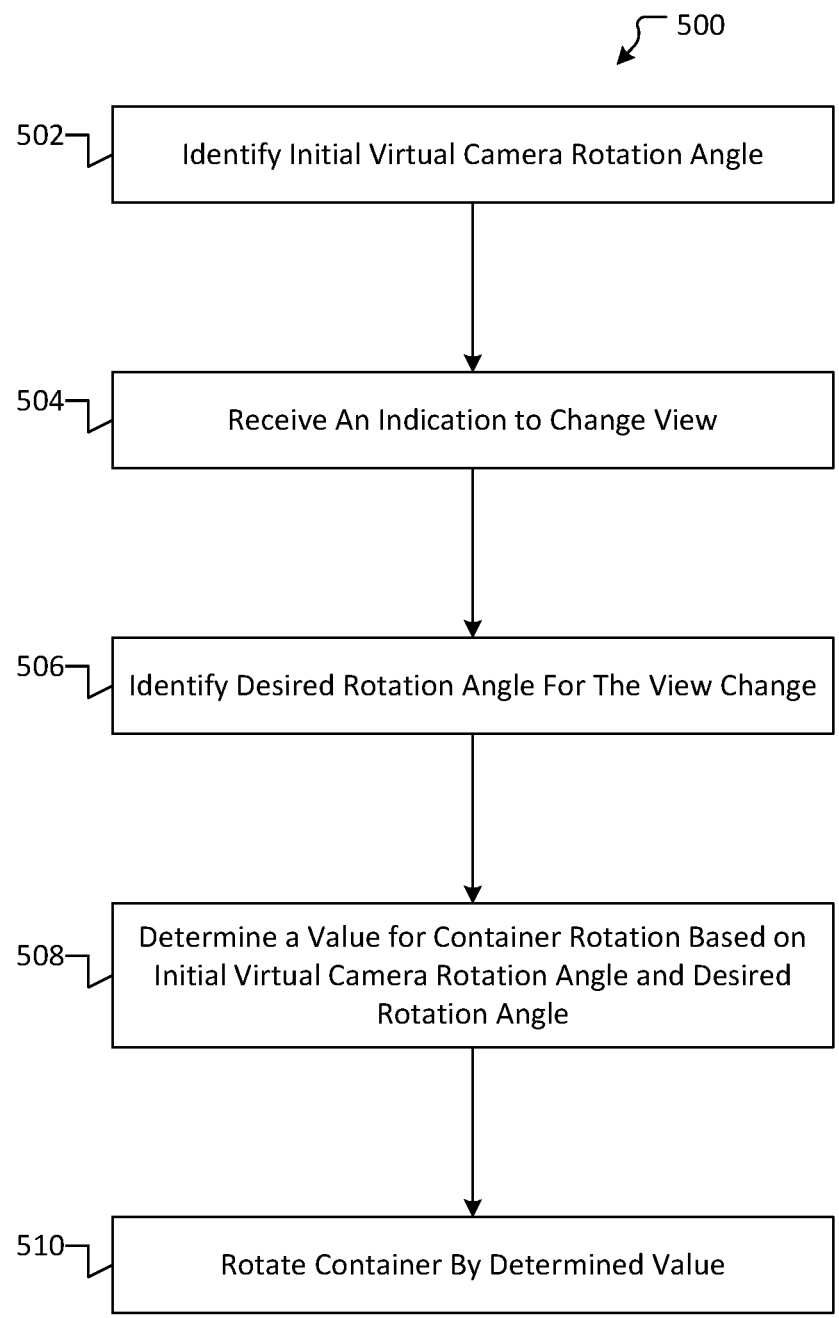
FIG. 5 depicts an example method for controlling a view of a virtual camera in a virtual world with the use of a container.

FIG. 5 depicts an example method for controlling a view of a virtual camera in a virtual world with the use of a container. The container is configured such that rotation of the container causes rotation of the virtual camera with respect to the global coordinate system. At operation 502, an initial rotation angle of the virtual camera is determined with respect to a global coordinate system of the virtual world. The initial rotation angle of the virtual camera is based at least partially on the position of the HMD, as discussed above, and thus the initial rotation angle may be referred to as an initial HMD rotation angle or an initial virtual camera rotation angle. The initial rotation angle may be the rotation angle of the virtual camera just before receiving a request to change the user's view or the rotation angle of the virtual camera just before a final view is displayed, among other potential timeframes. The initial rotation angle may be any of roll, pitch, and/or raw. For instance, the rotation angle may be a combination of any of roll, pitch, and/or yaw. The rotation angle may also be a single one of roll, pitch, or yaw.

At operation 504, an indication to change the user's view to a particular direction is received. For example, the indication to change the user's view may be the selection of a locomotion marker. In such an example, the locomotion marker may indicate a particular direction for the user's view, such as towards a view direction marker. Based on the particular direction for the user's view, a desired rotation angle for the view change is determined or identified in operation 506. The desired rotation angle is with respect to the global coordinate system. For instance, the desired rotation angle may be a value for a roll, pitch, and/or yaw with respect to the global coordinates. Other identifications of rotation angles, such as rotation matrices or other Euler angle representations, may also be utilized.

Once the desired rotation angle with respect to the global coordinate system has been identified, a rotation value for the container is determined at operation 508. The rotation value for the container is based on the initial virtual camera rotation angle identified in and the desired rotation angle. The rotation value may be determined to compensate for the initial virtual camera rotation angle such that rotating the container by the determined rotation value causes the view to be oriented in the desired direction. As an example, the rotation value for the container may be determined by first subtracting the initial virtual camera rotation angle from 360 degrees to generate an intermediate value. Next, the intermediate value is added to the desired rotation angle to generate the rotation value for the container. A modulus operator may also be used such that the resultant rotation value is not greater than 360. An example function that may be used to determine the rotation value is as follows:

```
// Rotate container to desired point
y1 = desired angle         (determined in operation 506)
y2 = initial virtual camera angle  (determined in operation 502)
y3 = 360 − y2              (intermediate value)
nY = (y1 + y3) % 360       (the rotation value for the container)
```

The % symbol in the above functionality is a modulus operator.

At operation 510, the container is rotated by the determined rotation value. By rotating the container by the determined rotation value, the container causes a final virtual camera rotation angle to be equivalent to the desired rotation angle relative to the global coordinate system. For example, the user's final view after rotation is in the desired direction, such as the direction associated with a selected locomotion marker. In some examples, the display on the HMD may fade to black or otherwise obscure the display before displaying the final view. For instance, upon a selection of a locomotion marker, the screen may fade to black, and upon fading back from black, the view of the user will be in an orientation of the final virtual camera angle.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
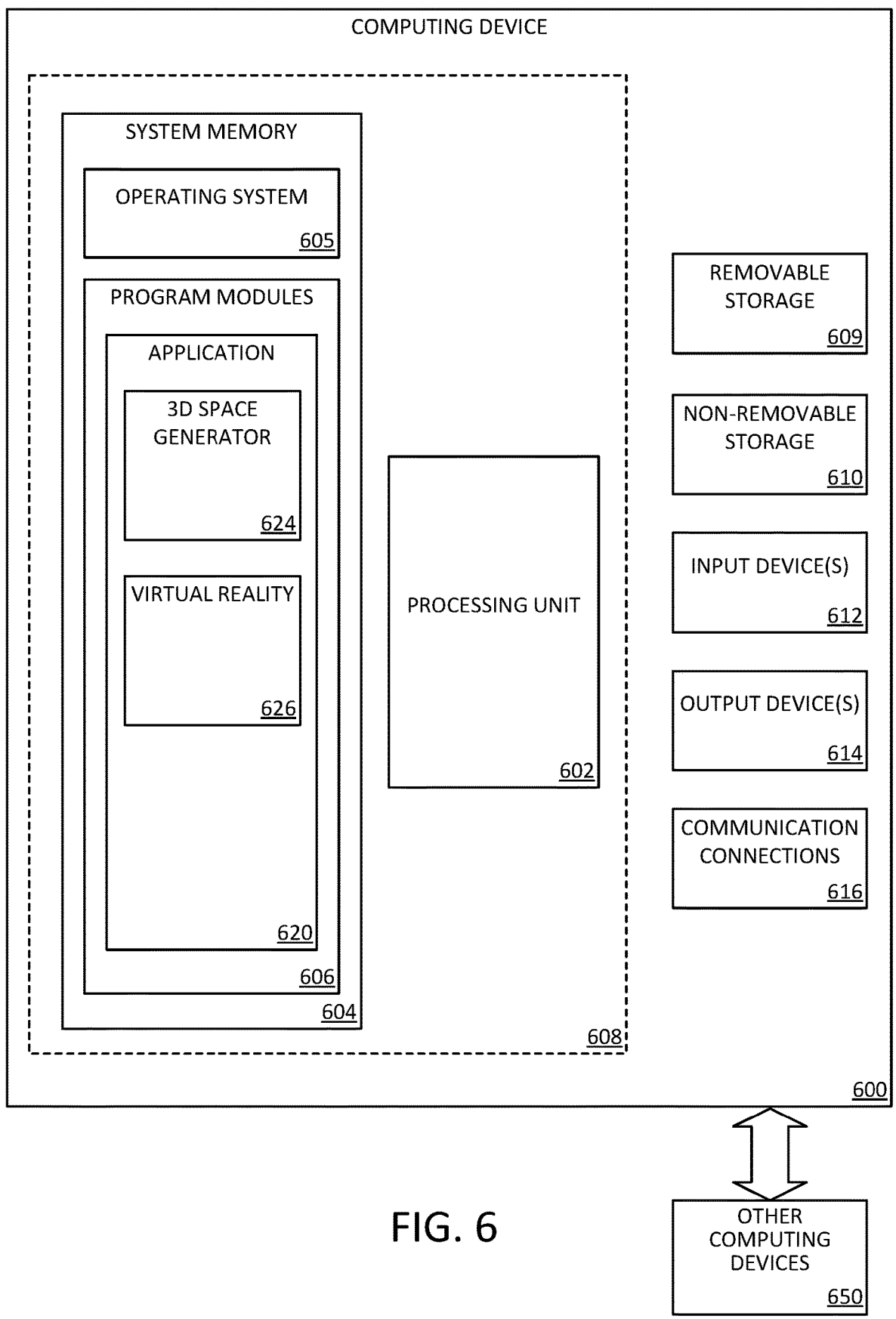
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above, such as smart phones, tablets, HMDs, laptops, desktops, or other computing devices. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store a virtual world and associated functions and operations to be completed within the virtual world. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include a 3D space generator 624, 3D processing and virtual reality applications 626, electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, handheld gaming controller, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media is not a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
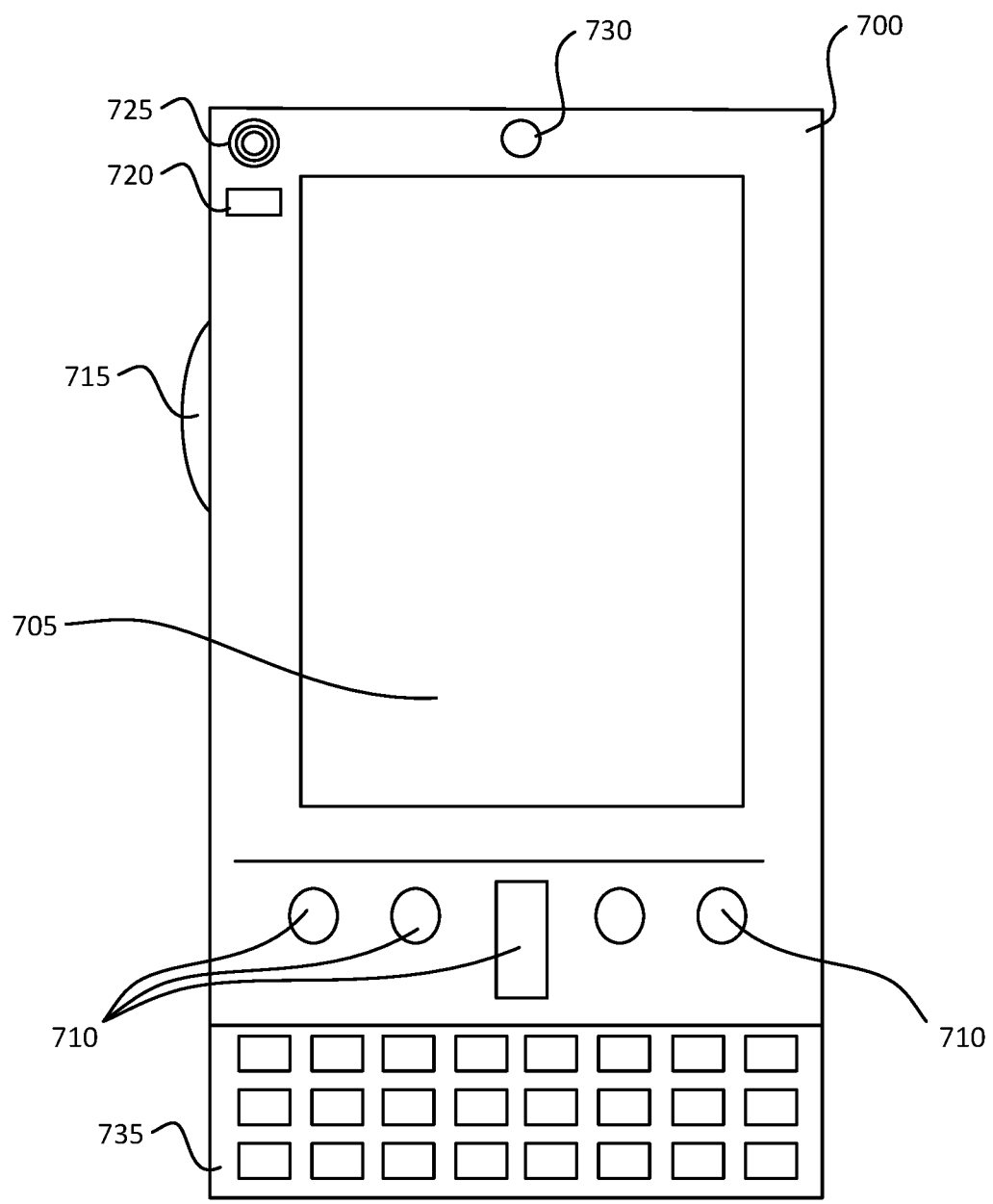
FIGS. 7A and 7B are simplified block diagrams of a mobile computing device with which aspects of the present disclosure may be practiced.
Figure 7B:
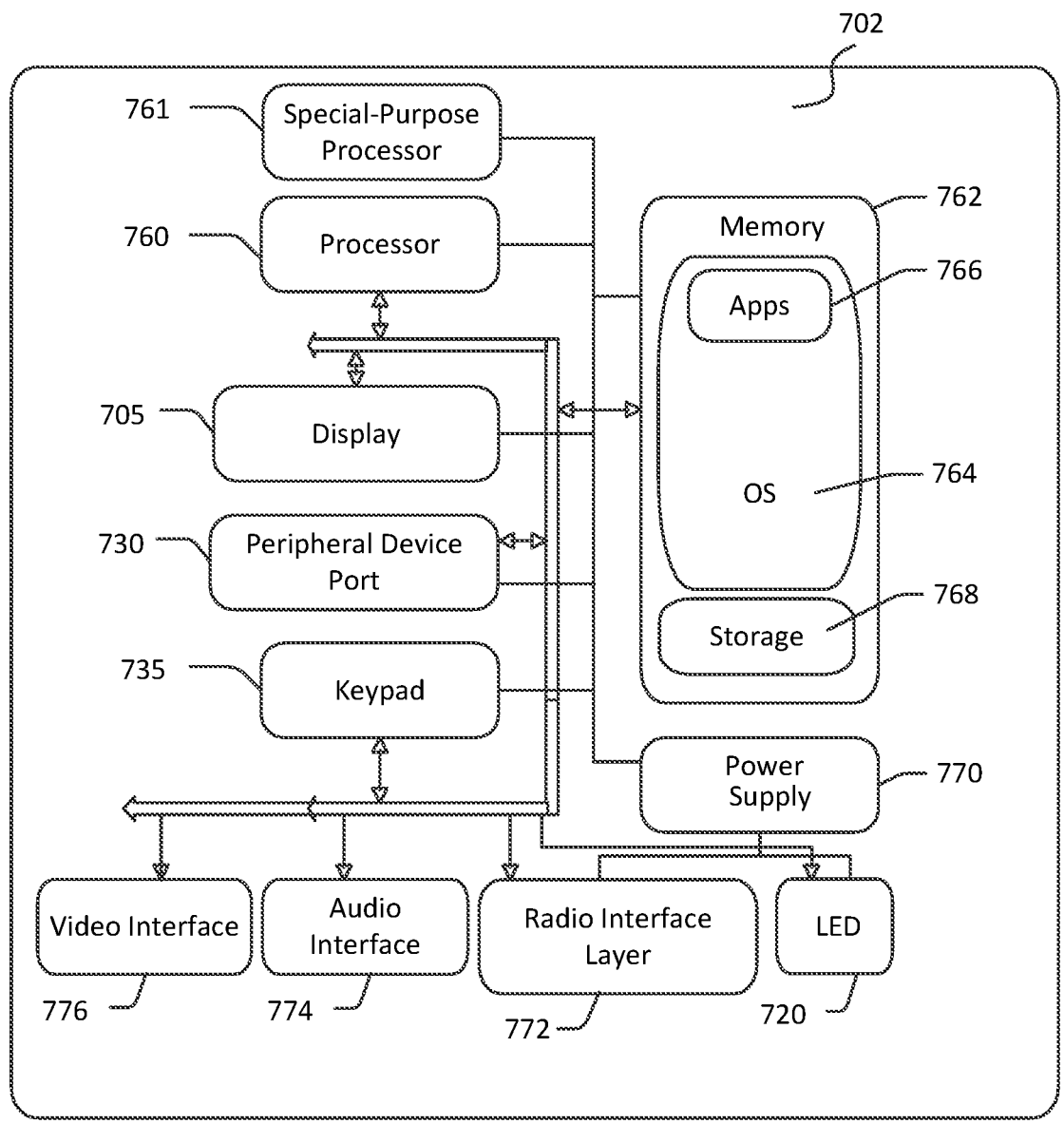

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., search engine, extractor module, relevancy ranking module, answer scoring module, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
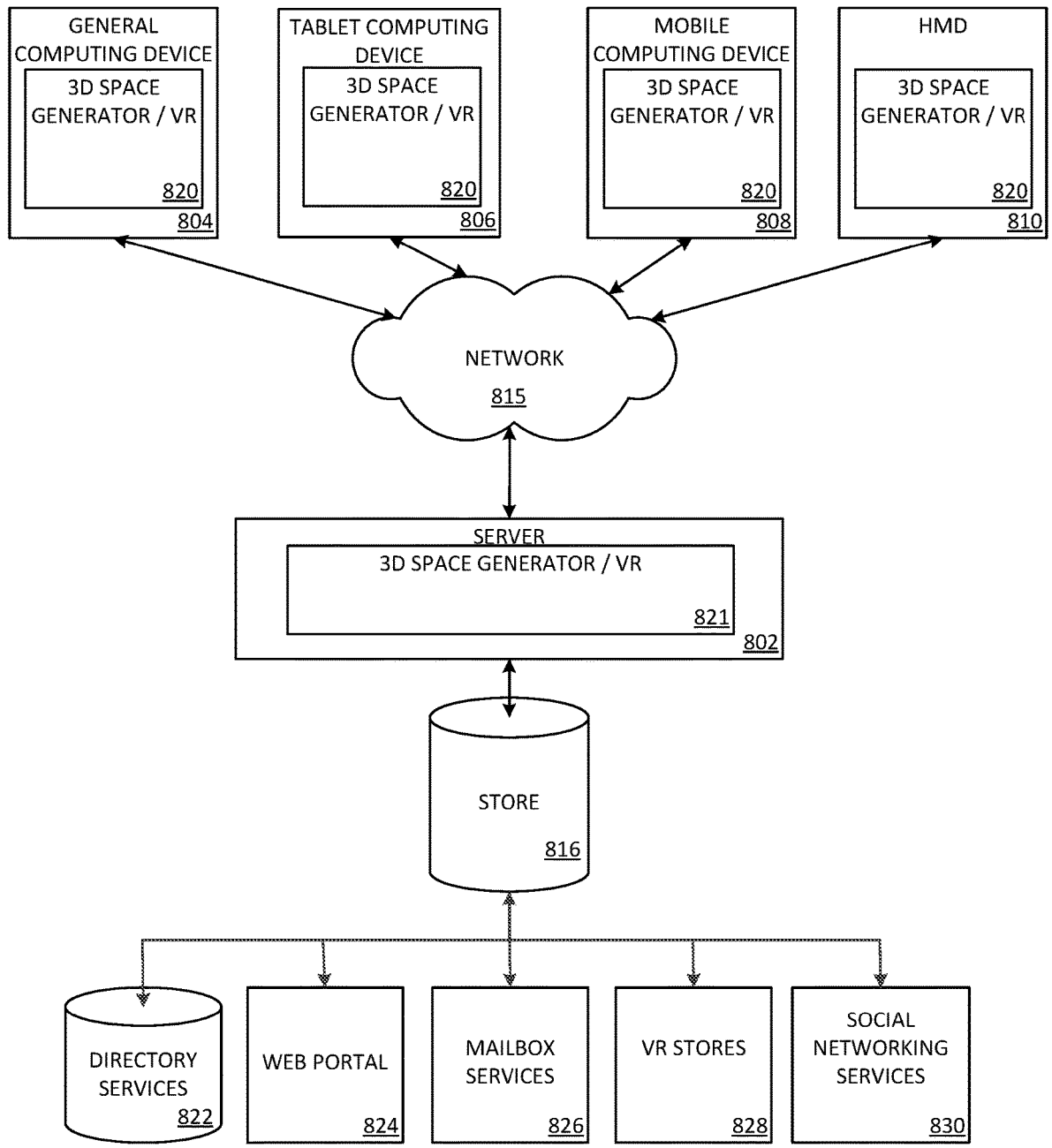
FIG. 8 is a simplified block diagram of a distributed computing system in which aspects of the present disclosure may be practiced.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, a virtual reality store 828, or a social networking site 830.

A 3D space generator and virtual reality program 820 may be employed by a client that communicates with server device 802, and/or the 3D space generator and virtual reality program 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806, a mobile computing device 808 (e.g., a smart phone), and/or an HMD 810. Any of these embodiments of the computing devices may obtain content from the store 816, in addition to receiving graphical data useable to be either pre-processed at a graphic-originating system, or post-processed at a receiving computing system.

Figure 9:
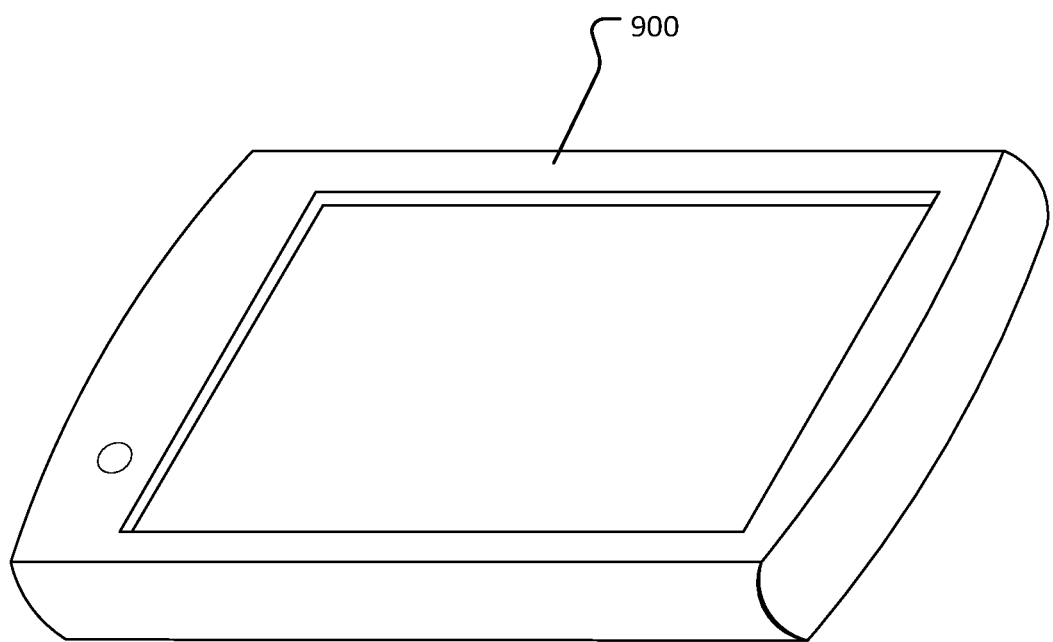
FIG. 9 illustrates a tablet computing device for executing one or more aspects of the present disclosure.

FIG. 9 illustrates an exemplary tablet computing device 900 that may execute one or more aspects disclosed herein in connection with a virtual reality device. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

At least the following aspects will appreciated from the foregoing discussion. In one aspect, the technology relates to a method for controlling a view of a virtual camera in a virtual world. The method includes, based on a position of a head-mounted display, identifying an initial virtual camera rotation angle, relative to a global coordinate system of the virtual world, wherein the virtual camera is wrapped in a container such that rotation of the container causes rotation of the virtual camera relative to the global coordinate system; receiving an indication to change the view to a particular direction; identifying a desired rotation angle, relative to the global coordinate system, for a view to correspond to the particular direction; and rotating the container by a rotation value based at least on both the desired rotation angle and the initial virtual camera rotation angle. In an example, rotating the container causes a final virtual camera rotation angle to be equivalent to the desired rotation angle relative to the global coordinate system. In another example, the method also includes displaying, on a display screen of the HMD, the view of the virtual camera according to the initial virtual camera angle; based on receiving an indication to change the view to a particular direction, fading the screen to black; and fading the screen from black to display the view of the virtual camera according to the final virtual camera rotation angle. In yet another example, receiving the indication includes receiving a selection of a locomotion marker. In still yet another example, the method also includes displaying a selectable locomotion marker, wherein the display of the selectable locomotion marker indicates the particular direction.

In another example, the rotation angle comprises at least one of a pitch angle, a yaw angle, or a roll angle. In yet another example, the method further includes determining the rotation value by: subtracting the initial virtual camera rotation angle from 360 degrees to generate an intermediate value; and adding the intermediate value to the desired rotation angle to generate the rotation value.

In another aspect, the technology relates to a system including a head mounted display (HMD); at least one processor operatively connected to the HMD; and a memory storing instructions that, when executed by the at least one processor, perform a set of operations comprising: based on a position of the HMD, identifying an initial virtual camera rotation angle of a virtual camera, relative to a global coordinate system of the virtual world, wherein the virtual camera is wrapped in a container such that rotation of the container causes rotation of the virtual camera relative to the global coordinate system; receiving an indication to change the view to a particular direction; identifying a desired rotation angle, relative to the global coordinate system, for a view to correspond to the particular direction; and rotating the container by a rotation value based at least on both the desired rotation angle and the initial virtual camera rotation angle.

In an example, rotating the container causes a final virtual camera rotation angle to be equivalent to the desired rotation angle relative to the global coordinate system. In another example, the operations further include displaying, on a display screen of the HMD, the view of the virtual camera according to the initial virtual camera angle; based on receiving an indication to change the view to a particular direction, fading the screen to black; and fading the screen from black to display the view of the virtual camera according to the final virtual camera rotation angle. In yet another example, receiving the indication comprises receiving a selection of a locomotion marker. In still yet another example, the operations further comprise displaying a selectable locomotion marker, wherein the display of the selectable locomotion marker indicates the particular direction. In another example, the rotation angle comprises at least one of a pitch angle, a yaw angle, or a roll angle. In yet another example, the operations further include determining the rotation value by: subtracting the initial virtual camera rotation angle from 360 degrees to generate an intermediate value; and adding the intermediate value to the desired rotation angle to generate the rotation value.

In another aspect, the technology relates to a method for controlling a view of a virtual camera in a virtual world. The method includes, based on a position of a head-mounted display, identifying an initial virtual camera rotation angle of a virtual camera, wherein the virtual camera is associated with a container such that rotation of the container causes rotation of the virtual camera relative to the global coordinate system; displaying, on a display screen of the HMD, the view of the virtual camera according to the initial virtual camera angle; displaying, on the display screen of the HMD, a locomotion marker; receiving a selection of the locomotion marker; identifying a particular direction for a view corresponding to the selected locomotion marker; identifying a desired rotation angle for a view to correspond to the particular direction; and rotating the container by a rotation value based at least on both the desired rotation angle and the initial virtual camera rotation angle. In an example, rotating the container causes a final virtual camera rotation angle to be equivalent to the desired rotation angle relative to the global coordinate system. In another example, the rotation angle comprises at least one of a pitch angle, a yaw angle, or a roll angle. In yet another example, the operations further include determining the rotation value by: subtracting the initial virtual camera rotation angle from 360 degrees to generate an intermediate value; and adding the intermediate value to the desired rotation angle to generate the rotation value. In still yet another example, the method further includes determining whether a view of the user is within a predetermined area, and wherein displaying the locomotion marker is based on the view of the user being within the predetermined area. In another example, the method further includes displaying a snap zone and a view direction marker.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed technology. The claimed technology should not be construed as being limited to any aspect, example, or detail provided in this application. Regardless of whether shown and described in combination or separately, the various features (both structural and methodological) are intended to be selectively included or omitted to produce an embodiment with a particular set of features. For instance, the above described examples may be readily combined with one another. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A method for controlling a view of a virtual camera in a virtual world, the method comprising:
    based on a position of a head-mounted display, identifying an initial virtual camera rotation angle, relative to a global coordinate system of the virtual world, wherein the virtual camera is wrapped in a container such that rotation of the container causes rotation of the container and the virtual camera relative to the global coordinate system, wherein the virtual camera is configured to rotate relative to the container based on the position of the head-mounted display;
    receiving an indication to change the view to a particular direction;
    identifying a desired rotation angle, relative to the global coordinate system, for a view to correspond to the particular direction; and
    rotating the container by a rotation value based at least on both the desired rotation angle and the initial virtual camera rotation angle.

2. The method of claim 1, wherein rotating the container causes a final virtual camera rotation angle to be equivalent to the desired rotation angle relative to the global coordinate system.

3. The method of claim 1, further comprising:
    displaying, on a display screen of the HMD, the view of the virtual camera according to the initial virtual camera angle;
    based on receiving an indication to change the view to a particular direction, fading the screen to black; and
    fading the screen from black to display the view of the virtual camera according to the final virtual camera rotation angle.

4. The method of claim 1, wherein receiving the indication comprises receiving a selection of a locomotion marker.

5. The method of claim 1, further comprising displaying a selectable locomotion marker, wherein the display of the selectable locomotion marker indicates the particular direction.

6. The method of claim 1, wherein the rotation angle comprises at least one of a pitch angle, a yaw angle, or a roll angle.

7. The method of claim 1, further comprising determining the rotation value by:
    subtracting the initial virtual camera rotation angle from 360 degrees to generate an intermediate value; and
    adding the intermediate value to the desired rotation angle to generate the rotation value.

8. A system comprising:
    a head mounted display (HMD);
    at least one processor operatively connected to the HMD; and
    a memory storing instructions that, when executed by the at least one processor, perform a set of operations comprising:

based on a position of the HMD, identifying an initial virtual camera rotation angle of a virtual camera, relative to a global coordinate system of the virtual world, wherein the virtual camera is wrapped in a container such that rotation of the container causes rotation of the virtual camera and the container relative to the global coordinate system, wherein the virtual camera is configured to rotate relative to the container based on the position of the head-mounted display;

receiving an indication to change the view to a particular direction;

identifying a desired rotation angle, relative to the global coordinate system, for a view to correspond to the particular direction; and rotating the container by a rotation value based at least on both the desired rotation angle and the initial virtual camera rotation angle.

9. The system of claim 8, wherein rotating the container causes a final virtual camera rotation angle to be equivalent to the desired rotation angle relative to the global coordinate system.

10. The system of claim 8, wherein the operations further comprise:

displaying, on a display screen of the HMD, the view of the virtual camera according to the initial virtual camera angle;

based on receiving an indication to change the view to a particular direction, fading the screen to black; and fading the screen from black to display the view of the virtual camera according to the final virtual camera rotation angle.

11. The system of claim 8, wherein receiving the indication comprises receiving a selection of a locomotion marker.

12. The system of claim 8, wherein the operations further comprise displaying a selectable locomotion marker, wherein the display of the selectable locomotion marker indicates the particular direction.

13. The system of claim 8, wherein the rotation angle comprises at least one of a pitch angle, a yaw angle, or a roll angle.

14. The system of claim 8, wherein the operations further comprise determining the rotation value by:

subtracting the initial virtual camera rotation angle from 360 degrees to generate an intermediate value; and adding the intermediate value to the desired rotation angle to generate the rotation value.

15. A method for controlling a view of a virtual camera in a virtual world, the method comprising:

based on a position of a head-mounted display (HMD), identifying an initial virtual camera rotation angle of a virtual camera, wherein the virtual camera is associated with a container such that rotation of the container causes rotation of the virtual camera and the container relative to the global coordinate system, wherein the virtual camera is configured to rotate relative to the container based on the position of the HMD;

displaying, on a display screen of the HMD, the view of the virtual camera according to the initial virtual camera angle;

displaying, on the display screen of the HMD, a locomotion marker;

receiving a selection of the locomotion marker;

identifying a particular direction for a view corresponding to the selected locomotion marker;

identifying a desired rotation angle for a view to correspond to the particular direction; and rotating the container by a rotation value based at least on both the desired rotation angle and the initial virtual camera rotation angle.

16. The method of claim 15, wherein rotating the container causes a final virtual camera rotation angle to be equivalent to the desired rotation angle relative to the global coordinate system.

17. The method of claim 15, wherein the rotation angle comprises at least one of a pitch angle, a yaw angle, or a roll angle.

18. The method of claim 15, wherein the operations further comprise determining the rotation value by:

subtracting the initial virtual camera rotation angle from 360 degrees to generate an intermediate value; and adding the intermediate value to the desired rotation angle to generate the rotation value.

19. The method of claim 15, further comprising determining whether a view of the user is within a predetermined area, and wherein displaying the locomotion marker is based on the view of the user being within the predetermined area.

20. The method of claim 15, further comprising, based on the position of the HMD, displaying a highlighted area to indicate an object for selection and a view direction marker.

* * * * *